US008645797B2

(12) United States Patent
Yigzaw et al.

(10) Patent No.: US 8,645,797 B2
(45) Date of Patent: Feb. 4, 2014

(54) INJECTING A DATA ERROR INTO A WRITEBACK PATH TO MEMORY

(75) Inventors: Theodros Yigzaw, Sherwood, OR (US); Yen-Cheng Liu, Portland, OR (US); Mohan J. Kumar, Aloha, OR (US); Jose A. Vargas, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 13/323,405

(22) Filed: Dec. 12, 2011

(65) Prior Publication Data

US 2013/0151930 A1    Jun. 13, 2013

(51) Int. Cl.
*G11C 29/00*    (2006.01)
(52) U.S. Cl.
USPC ............................................. 714/768; 714/41
(58) Field of Classification Search
USPC ............ 716/106; 714/20, 8, 41, 42, 703, 728, 714/718, 768
See application file for complete search history.

(56) References Cited

U.S. PATENT DOCUMENTS

| 4,999,837 | A  | * | 3/1991 | Reynolds et al. | 714/703 |
|---|---|---|---|---|---|
| 5,872,910 | A  | * | 2/1999 | Kuslak et al. | 714/41 |
| 7,320,114 | B1 | * | 1/2008 | Jain et al. | 716/106 |
| 7,587,639 | B2 | * | 9/2009 | Marisetty et al. | 714/41 |
| 2007/0083792 | A1 | * | 4/2007 | McDermott et al. | 714/20 |
| 2007/0174679 | A1 | * | 7/2007 | Chelstrom et al. | 714/8 |
| 2007/0208977 | A1 | * | 9/2007 | Clark et al. | 714/728 |
| 2011/0179311 | A1 | * | 7/2011 | Nachimuthu et al. | 714/42 |

* cited by examiner

*Primary Examiner* — David Ton
(74) *Attorney, Agent, or Firm* — Trop, Pruner & Hu, P.C.

(57) ABSTRACT

In one embodiment, a processor includes error injection circuitry separate and independent of debug circuitry of the processor. This circuitry can be used by a software developer to seed errors into a write-back path to system memory to emulate errors for purposes of validation of error recovery code of the software. The circuitry can include a register to store an address within the system memory at which an error is to be injected, a detection logic to detect when an instruction associated with the address is issued, and injection logic to cause the error to be injected into the address within the system memory responsive to the detection of the instruction. Other embodiments are described and claimed.

21 Claims, 6 Drawing Sheets

INJECTING A DATA ERROR INTO A WRITEBACK PATH TO MEMORY

BACKGROUND

In developing software for execution on a processor, it is helpful to have access to debug information available in the processor. However, many debug mechanisms of the processor are for purposes of testing and debug during the design and manufacture of the processor and thus are not accessible, at least in a straightforward manner, to a software developer. Instead, to leverage debug features that were meant for internal (within a processor manufacturer) use only, various microcode patches are implemented that require significant support. These solutions are quite cumbersome, require high levels of support, and eventually raise concerns with computer manufacturers and software developers. Thus for developers that want to exploit debug features provided within a processor, much time and energy is involved in developing the software and enabling an interface to the debug features. To this end the processor manufacturer typically provides the necessary hooks to allow access to such features, which itself can be a time consuming and unwieldy endeavor.

DETAILED DESCRIPTION

Embodiments provide an interface and mechanism that can be accessed by software such as software under development, to insert or seed errors on a write-back operation. In such write-back operations, data stored in a cache memory of a processor such as a last level cache (LLC) is evicted from the cache and written to system memory. Software can be designed to recover from uncorrected data errors encountered during such write-back to memory. In order to develop the code that performs this recovery (and validate it), the processor can be configured with hardware to provide a mechanism that allows the software to inject data errors into a given system address at will on this write-back path. Note that this hardware is separate and independent of any internal debug hardware within the processor that is designed in for purposes of internal usage by the processor manufacturer.

In order for this type of error injection mechanism to be accessible to software such as privileged or non-privileged software under development, it can be used in connection with a physical (or system) address. In one embodiment, the error injection mechanism can include a register for programming the system address at which the error is to be injected, a locking mechanism to protect access to this register, and surrounding logic for detecting an address match and injecting the error on the match. For example, a software vendor or original equipment manufacturer (OEM) can inject data errors into a given memory location, to cause a machine check error to be logged and signaled on a write-back from a corresponding location in the LLC to memory.

Since injecting an actual error into the LLC array may be computationally expensive and unwieldy, embodiments may instead emulate or mimic operations that occur when a data error is detected during an LLC write-back to memory. To this end, software is provided access to a register that it can program with the system address of the cache line where it seeks to seed the error. This register is equipped with a locking mechanism that can be write accessed only in a secure mode of operation, e.g., a system management mode (SMM), thus providing protection against malicious use. In some embodiments, the register can also include an arming mechanism via a valid indicator, e.g., a valid bit. Software arms the mechanism by setting the valid bit after programming the address. In addition, the software can be coded in a manner to cause the data in the cache line of the cache memory associated with the address to be seeded with an error when it is in a dirty state. As such, cache control logic can be used to ensure that the cache line associated with the given address has data in a modified (M) cache coherency state, since no write-back to memory will occur if the cache line is not in a modified state.

In operation, once the address register has been programmed, the software is expected to perform a cache line flush (e.g., a CLFLUSH) instruction to the address programmed in the register, thereby causing a write-back to memory. The hardware has logic that analyzes instructions and corresponding addresses to determine whether a match occurs for the programmed address and an appropriate request type, e.g., a CLFLUSH (or snoop type) request. In one embodiment, if a match is found, then the hardware asserts a machine check error, logs an LLC write-back type error in an associated machine check bank and attaches a poison indication to the data headed towards memory. The data can be stored in memory with an indication that it arrived poisoned from another source. In some embodiments, a counter or flag can be coupled to the logic to track whether the error injection occurred successfully. Note that although this CLFLUSH instruction is one type of trigger for error insertion, the scope of the present invention is not so limited. As other examples, the error injection mechanism can be triggered by software that is expected to cause a write-back of data to memory. For example, an operating system vendor (OSV) may include code that runs a cache intensive workload in the background that at some future times causes the eviction without a CLFLUSH instruction. In this way, regular software can be running when the error occurs.

Although the described embodiment is for purposes of injecting errors in a data poisoning mode of operation, embodiments apply equally where data poisoning is not enabled. To this end, instead of a poison indicator, a parity indicator or error correction code (ECC) indicator associated with write-back data can be updated to indicate an error.

Figure 1:
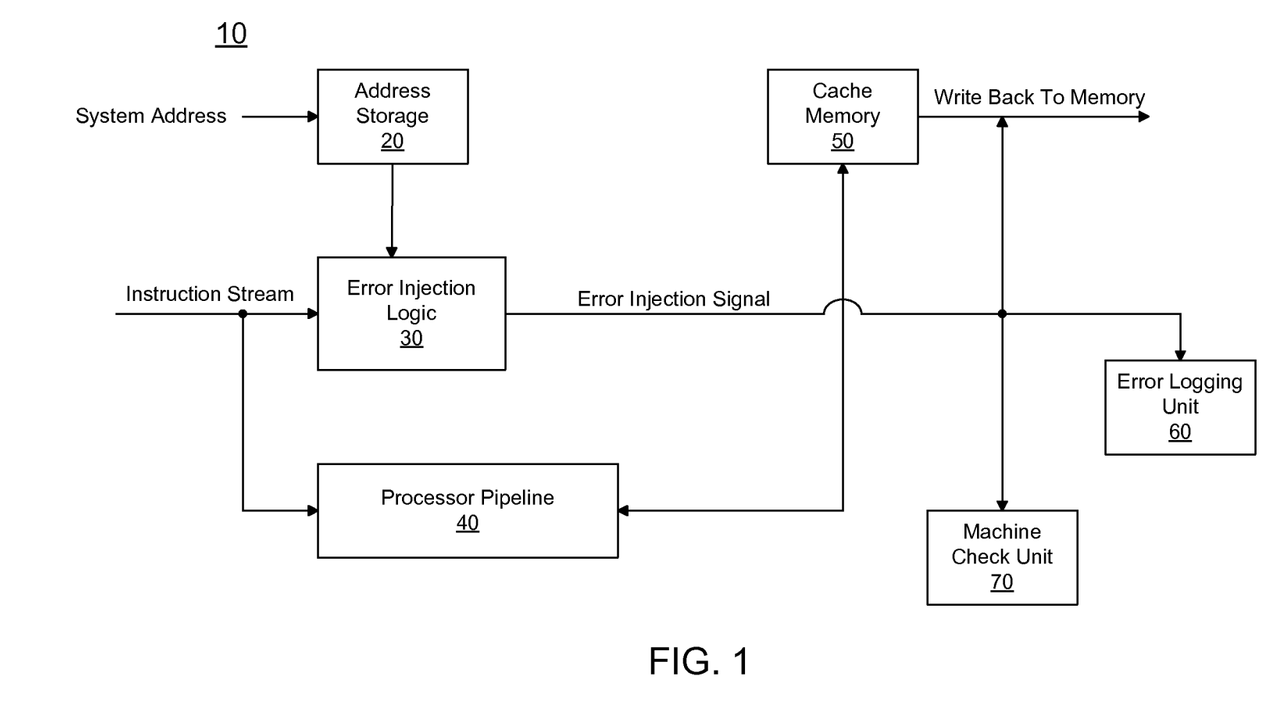
FIG. 1 is a block diagram of a high level view of an error injection mechanism in accordance with an embodiment of the present invention.

Referring now to FIG. 1, shown is a block diagram of a high level view of an error injection mechanism in accordance with an embodiment of the present invention. As shown in FIG. 1, a processor 10 can include a multi-stage pipeline 40. In general, incoming instructions can be provided to various stages of the pipeline, which can perform instruction fetching, decode, execution and retirement, generally in a number of stages including front end stages, execution stages and back end stages. In turn, pipeline 40 can be coupled to a cache memory 50 such as a last level cache that in turn can be coupled to an off-chip memory such as system memory. Of course additional levels of a memory hierarchy such as one or more private caches may be interposed between the pipeline circuitry and cache memory 50.

To provide an error injection mechanism in accordance with an embodiment of the present invention, an address storage 20 can be provided. In various embodiments, this address storage can be one or more registers to store addresses, e.g., physical addresses corresponding to locations within the system memory in which a software developer seeks to inject an error. In some embodiments, this storage can be configured as a content addressable memory (CAM). Accordingly, address storage 20 can be configured to receive incoming addresses, which can be received in one embodiment via a given user-level instruction such as a write to a machine specific register (MSR) (Write MSR) corresponding to the address storage. Or in another embodiment, the software can make, e.g., an Advanced Configuration and Platform Interface (ACPI) call to basic input/output system (BIOS) to cause the BIOS to insert the desired address into address storage 20. This operation thus configures the system to be able to perform error injections for the individual address(es).

In turn, the one or more addresses stored in address storage 20 can be provided along with an incoming instruction stream to an error injection logic 30. Note that both address storage 20 and error injection logic 30 can be separate from pipeline 40. More specifically, in various embodiments this error injection circuitry can be located in protocol layer circuitry such as present in an uncore or system agent circuitry that resides externally from the cores of a multicore processor.

In general, error injection logic 30 determines whether an address associated with an incoming instruction matches an address stored in address storage 20 and furthermore whether the instruction type is one of a predetermined number of instructions for which it is desired to inject an error. If so, an error injection signal can be raised which can generate an error signal (e.g., a machine check error). This error can be sent to machine check hardware such as a machine check unit 70 which prepares error information to be used by an error handler. In addition, this error signal can trigger an error indicator to be provided along with the data associated with the address when it is written back to memory. Still further, this injected error can be stored in an error logging unit 60, which in one embodiment can be a machine check storage associated with the affected address. Although shown at this high level in the embodiment of FIG. 1, understand the scope of the present invention is not limited in this regard. For example, in various embodiments a machine check exception can be signaled along with an error notification to the platform via an error pin.

Figure 2:
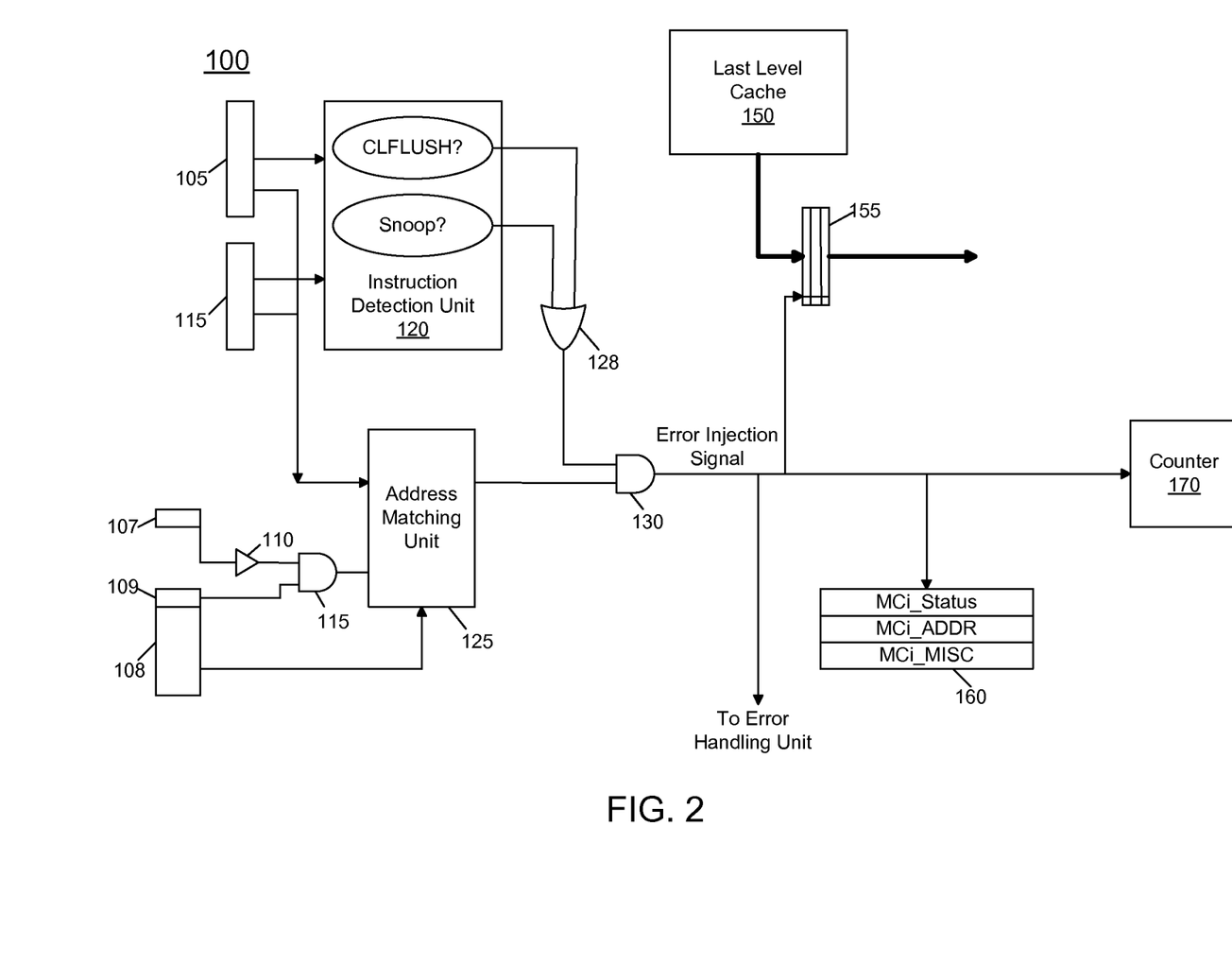
FIG. 2 is a block diagram illustrating further details of error injection circuitry in accordance with an embodiment of the present invention.

Referring now to FIG. 2, shown is a block diagram illustrating further details of error injection circuitry in accordance with an embodiment of the present invention. As shown in FIG. 2, a portion of a processor 100 can include various circuitry associated with error injection mechanisms. Specifically as seen, an address for which an error is to be injected can be stored in an error injection register 108, along with a valid indicator 109 to indicate that this stored address is valid. In some embodiments, this register can be a MSR register that is locked such that it can only be written during a secure mode such as SMM, e.g., via control of a lock indicator 107, which can be set by BIOS or in another manner. Accordingly, an address matching unit 125 can receive an address stored in error injection register 108, along with addresses of an incoming instruction stream, e.g., received from multiple queues. Specifically in the embodiment shown in FIG. 2 these queues can include an instruction queue (IQ) 105 and an a snoop queue (SNPQ) 115, which as seen can provide addresses to the address matching unit. Note that in various embodiments address matching unit 125 is enabled only when the lock indicator is inactive, meaning that the system is in a non-secure mode (e.g., normal code execution) such that the address register cannot be written to. Further, for address matching unit 125 to be enabled, the valid indicator is also valid and thus via inverter 110 and a logic gate 115, which in one embodiment can be an AND gate, address matching unit 125 is enabled to perform address comparisons.

Still referring to FIG. 2, if the address received from error injection register 108 matches an incoming address, address matching unit 125 may generate a match signal which is provided to a logic gate 130, e.g., an AND gate. This AND gate is configured to thus combine this match signal with an output of an instruction detection unit 120. In various embodiments, instruction detection unit 120 receives the instruction stream output from the IQ 105 and SNPQ 115 and determines whether predetermined types of instructions are present. In the embodiment shown in FIG. 2, these predetermined instructions can be a cache line flush instruction and a snoop instruction. Of course, other instruction types can be monitored. For example, in other embodiments, read/write instructions to be sent out via a different interface of the processor (e.g., a Quick Path Interconnect (QPI™) link in accordance with the QPI specification available from Intel Corporation, Santa Clara, Calif.), or other instruction types can be monitored. If a given instruction corresponds to one of these predetermined instructions, the output of a logic gate 128, e.g., an OR gate, is active to thus trigger an error injection signal from logic gate 130.

As seen, this error injection signal can be provided as a machine check error to an error handling unit such as a machine check hardware, which can perform preliminary work to obtain information to be provided to an error handler such as an exception handler. In addition, the error can be logged in a machine check bank 160, which in the embodiment shown can include a machine check status register which can, e.g., indicate whether the error is recoverable or unrecoverable, machine check address register to identify the address at which the error occurred, and a machine check miscellaneous register. Still further, the error signal can be provided to a data buffer 155, which buffers data being written back from LLC 150 to a system memory. In this way, a poison indicator or invalid indicator can thus be set for the corresponding entry that includes the data of the given address. Still further, the error injection signal can be provided to a counter 170, where a count of error injections can be incremented. In this way, a software developer can analyze code execution to ensure that the number of error injections in the code is equal to the number of error injections actually performed. Although shown at this high level in the embodiment of FIG. 2, understand the scope of the present invention is not limited in this regard.

Figure 3:
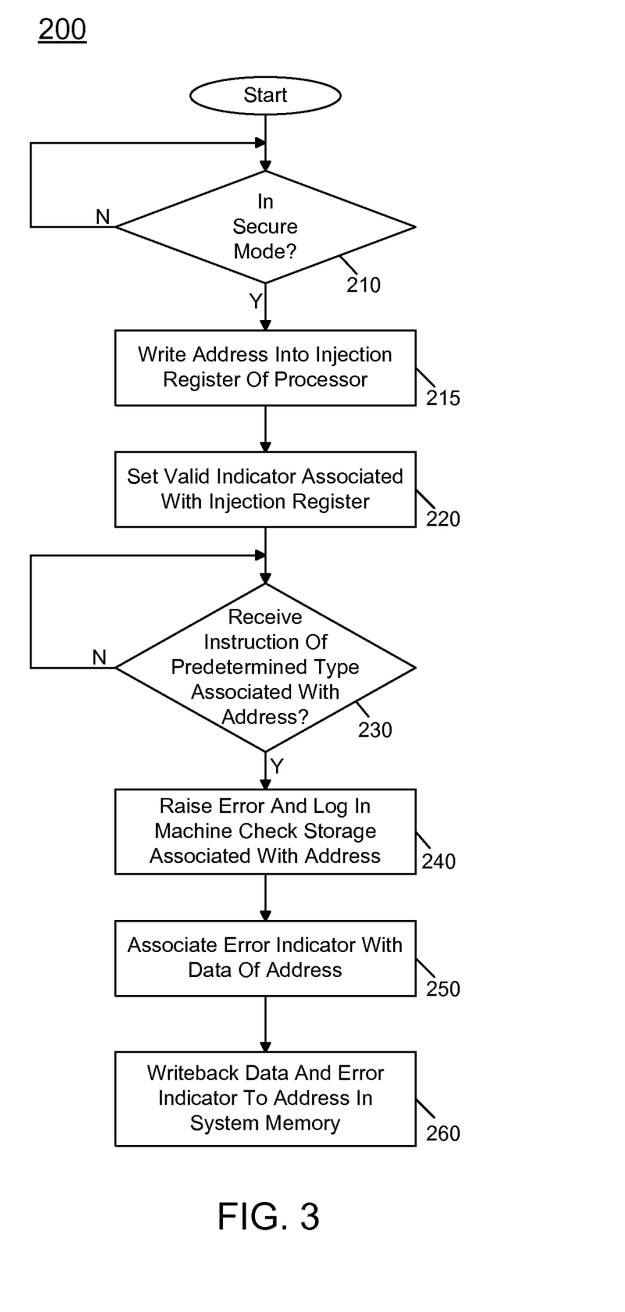
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 can be performed to inject an error responsive to a request by, e.g., software such as software under development that seeks to test suitability of its code for recovery from or otherwise handle errors occurring during write back to memory. As seen, method 200 may begin by determining whether a system is in a secure mode (diamond 210). For example, the software can cause an entry into a SMM or other secure mode. If so, control passes to block 215 where an address can be written into an error injection register of the processor. As discussed above, this address can be an address in system memory provided by the software to thus indicate a location in the system memory in which a developer desires to inject an error. Along with writing this address, a valid indicator can be set that is associated with this injection register (block 220). Accordingly at this point the error injection register is programmed and ready to be accessed during execution of the software to thus identify and inject an error.

Specifically as seen in FIG. 3, at diamond 230 it can be determined whether an instruction is received of a predetermined type that is associated with the address stored in the injection register. If so, control passes to block 240 where an error may be raised. In addition, this error can be logged in a machine check storage associated with the address. Control next passes to block 250 where an error indicator can be associated with data of the address. In the embodiment of FIG. 2 above this can be realized via a poison indicator set in an entry associated with a cache line corresponding to the system memory address present in a buffer in the write back path to system memory from a cache memory. Still referring to FIG. 3, control next passes to block 260 where this data can be written back to system memory along with this error indicator. Although shown with this particular implementation in the embodiment of FIG. 3, understand the scope of the present invention is not limited in this regard.

Figure 4:
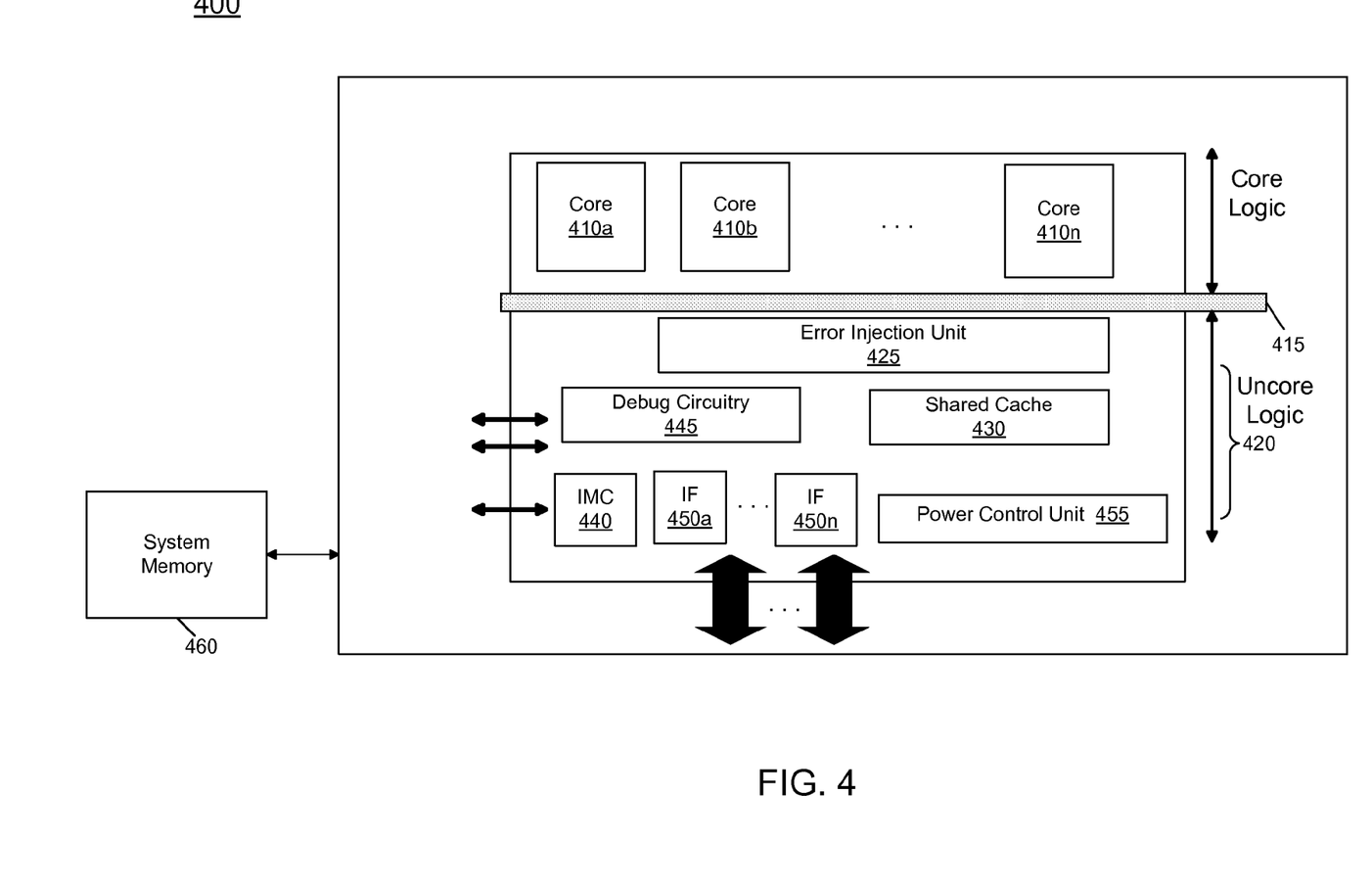
FIG. 4 is a block diagram of a processor in accordance with an embodiment of the present invention.

Embodiments can be implemented in many different types of processors. Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be of an independent power domain and can be configured to operate at an independent voltage and/or frequency, and to enter turbo mode when available headroom exists. The various cores may be coupled via an interconnect 415 to a system agent or uncore 420 that includes various components. As seen, the uncore 420 may include a shared cache 430 which may be a last level cache. To provide error injection capabilities that are accessible to software, e.g., under development, an error injection unit 425 also may be present in the uncore. This unit can store one or more system addresses provided by software and monitor for selected instructions associated with these addresses to inject errors in connection with write-back to memory. In addition, the uncore may include an integrated memory controller 440, various interfaces 450 and a power control unit 455. As also seen, internal debug circuitry 445 separate from the error injection unit may also be present. This circuitry can be used internally by the processor manufacturer to perform debug operations. Although not shown for ease of illustration, understand that similar debug circuitry can be present in the cores as well.

With further reference to FIG. 4, processor 400 may communicate with a system memory 460, e.g., via a memory bus. In various embodiments, system memory 460 can receive data along with associated status information, e.g., an invalid or poison indicator set by error injection unit 425 responsive to software control. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
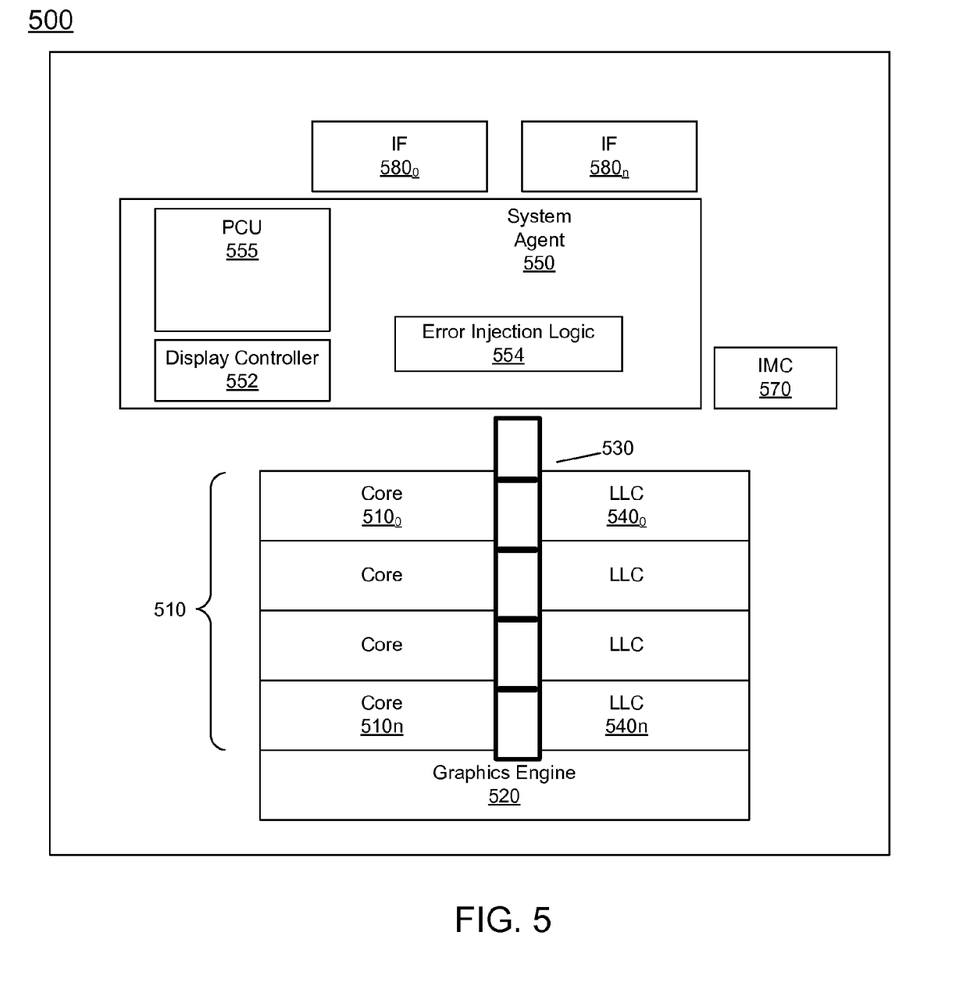
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510n$, a graphics domain 520 can include one or more graphics engines, and a system agent domain 550 may further be present. In various embodiments, system agent domain 550 may execute at a fixed frequency and may remain powered on at all times to handle power control events and power management such that domains 510 and 520 can be controlled to dynamically enter into and exit low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a LLC $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550.

As further seen, system agent domain 550 may include display controller 552 which may provide control of and an interface to an associated display. Also included system agent 550 is an error injection logic 554 in accordance with an embodiment of the present invention. As further seen, system agent domain 550 may include a power control unit 555 to perform power management operations for the processor.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 5, understand the scope of the present invention is not limited in this regard.

Figure 6:
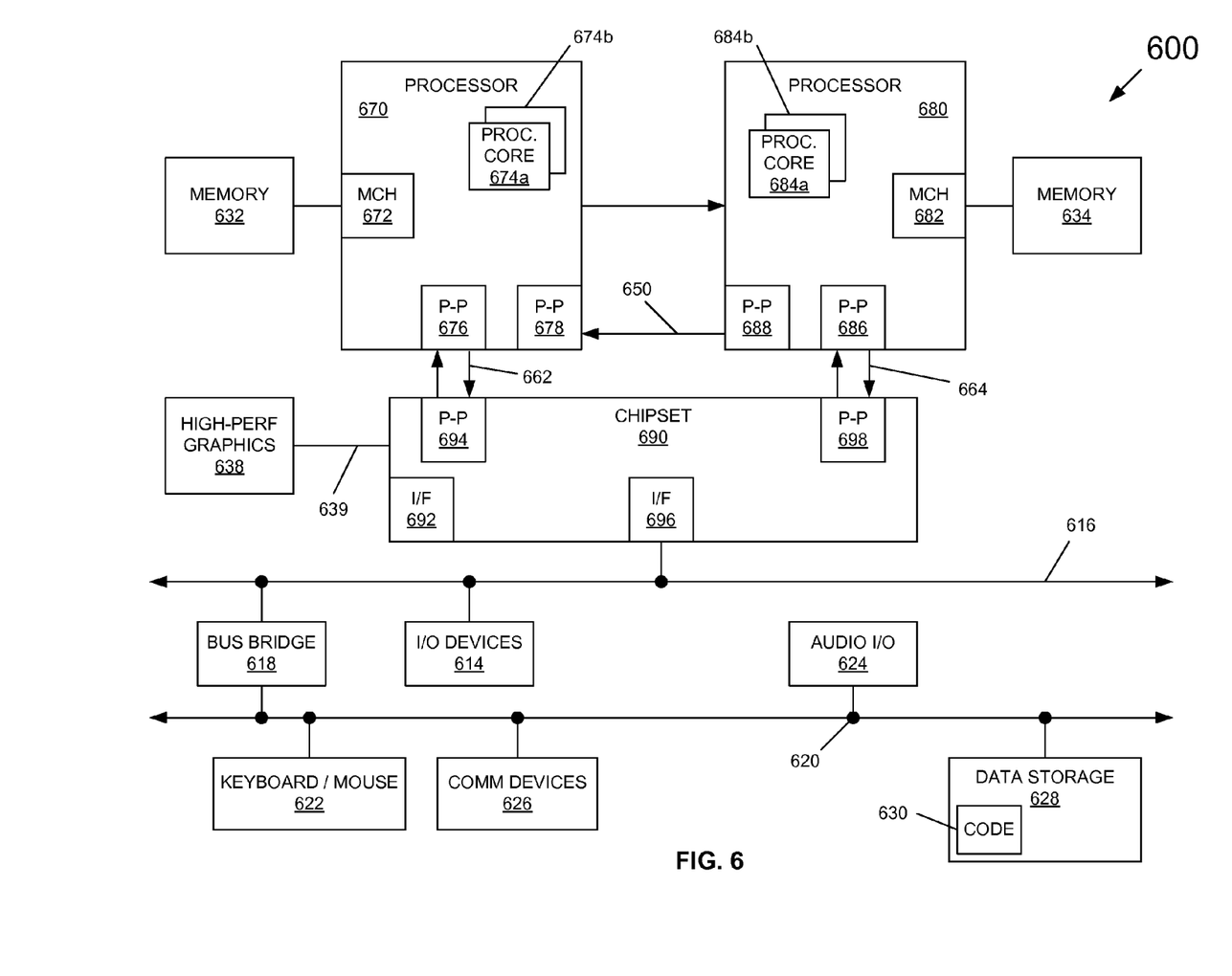
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include error injection circuitry to enable a software developer to seed the errors into selected system address locations during write-back operations to enable verification of error recovery code of the software, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM)

locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, ultrabook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments thus provide an inexpensive and dedicated hardware that is independent of debug features included for internal use only. There are no microcode or other patches to enable the feature. Moreover, embodiments operate with a given system address, making it directly applicable to the needs of OS vendors (OSVs). To maintain a single interface across product lines and provide security, embodiments may use BIOS support to enable the communication between the hardware logic and the software, e.g., by enabling a lock register when in a secure mode to allow the software to write the address into the register.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a register to store an address within a system memory coupled to a processor at which an error is to be injected;
a detection logic to detect when a first instruction associated with the address is issued; and
an injection logic to cause the error to be injected into the address within the system memory responsive to the detection of the first instruction by the detection logic.

2. The apparatus of claim 1, wherein the injection logic is to further inject an invalid indicator associated with the address within the system memory.

3. The apparatus of claim 2, wherein the injection logic is to inject the invalid indicator to emulate an error in a corresponding address of a cache memory of the processor.

4. The apparatus of claim 3, wherein the injection logic is to inject the error when data in the corresponding address of the cache memory is to be written back to the system memory.

5. The apparatus of claim 4, further comprising a buffer coupled between the cache memory and the system memory, wherein the injection logic is to inject the invalid indicator in an entry of the buffer including the data to be written back to the address within the system memory.

6. The apparatus of claim 1, wherein the injection logic is to further report the error to an error logging unit.

7. The apparatus of claim 1, further comprising a lock manager coupled to the register, wherein the lock manager is to permit non-privileged software to write the address into the register during a secure mode.

8. The apparatus of claim 7, wherein the register includes a valid indicator set by the non-privileged software when the address is written into the register.

9. The apparatus of claim 1, wherein the register, the detection logic and the injection logic are separate and independent from debug circuitry of the processor.

10. A method comprising:
writing an address into an error injection register of a processor; and
raising an error responsive to determining that an instruction of a given type associated with the address stored in the error injection register is to be executed by the processor.

11. The method of claim 10, further comprising writing the address into the error injection register of the processor when a system including the processor is in a secure mode.

12. The method of claim 11, further comprising setting a valid indicator associated with the error injection register responsive to writing the address into the error injection register.

13. The method of claim 10, further comprising associating an error indicator with data associated with the address when the data is removed from a cache memory of the processor to be written back to a system memory.

14. The method of claim 13, further comprising writing the data back to the system memory along with the error indicator.

15. The method of claim 13, wherein associating the error indicator with the data associated with the address includes storing a poison indicator in an entry of a buffer coupled between the cache memory and the system memory, wherein the data of the address is stored in the buffer entry.

16. The method of claim 10, wherein the given type of instruction corresponds to a cache line flush instruction or a snoop instruction, and further comprising comparing addresses of instructions to be executed to the address stored in the error injection register and raising the error responsive to a match between an address of an instruction of the instruction stream and the address, when the instruction of the instruction stream is of the given type.

17. The method of claim 10, further comprising writing the address into the error injection register via software under development to determine whether the software can handle an error during write back of data from a cache memory to system memory.

18. The method of claim 10, wherein raising the error includes sending a machine check error to a machine check hardware, storing information regarding the error in a machine check storage associated with the address, updating a count of injected errors, and storing a poison indicator in an entry of a buffer coupled between a cache memory and a system memory, wherein the data of the address is stored in the buffer entry.

19. A system comprising:
- a processor including a core to execute instructions, a cache memory, debug circuitry accessible to a manufacturer of the processor, and an error injection logic separate from the debug circuitry, wherein the error injection logic is to raise an error responsive to determination that an instruction of a selected type that is associated with an address corresponding to a location in a system memory at which the error is to be injected is received; and
- a dynamic random access memory (DRAM) coupled to the processor, the DRAM corresponding to the system memory.

20. The system of claim 19, wherein the error injection logic comprises:
- a register to store the address corresponding to the system memory location at which the error is to be injected;
- an address matching logic to determine when an instruction of an incoming instruction stream corresponds to the address stored in the register;
- a detection logic to detect when the instruction of the selected type is received in the error injection logic; and
- an injection logic to cause the error to be injected into the system memory location responsive to the detection of the instruction by the detection logic and determination of an address match by the address matching logic.

21. The system of claim 20, wherein the error injection logic is to enable software under development to write an address into the register to cause emulation of an error in a write-back path between a cache memory of the processor and the system memory.

* * * * *